(12) United States Patent
King et al.

(10) Patent No.: US 8,734,075 B1
(45) Date of Patent: May 27, 2014

(54) SHEARED POLE BUTT REMOVAL TOOL

(71) Applicants: Mark Hamilton King, Lebanon, MO (US); Terry Wolken, Phillipsburg, MO (US)

(72) Inventors: Mark Hamilton King, Lebanon, MO (US); Terry Wolken, Phillipsburg, MO (US)

( * ) Notice: Subject to any disclaimer, the term of this patent is extended or adjusted under 35 U.S.C. 154(b) by 0 days.

(21) Appl. No.: 13/725,093

(22) Filed: Dec. 21, 2012

Related U.S. Application Data

(60) Provisional application No. 61/590,389, filed on Jan. 25, 2012.

(51) Int. Cl.
*F16B 35/06* (2006.01)

(52) U.S. Cl.
USPC .......................................................... 411/401

(58) Field of Classification Search
USPC ..................... 411/383, 396, 401, 424, DIG. 1
See application file for complete search history.

(56) References Cited

U.S. PATENT DOCUMENTS

| | | | |
|---|---|---|---|
| 3,832,747 A * | 9/1974 | Nankivell et al. ................. | 470/2 |
| 7,641,430 B2 * | 1/2010 | Johnson et al. ............... | 411/132 |
| 7,686,359 B1 | 3/2010 | Walker | |
| 8,215,886 B2 * | 7/2012 | Campbell et al. ............. | 411/401 |
| 8,376,678 B2 * | 2/2013 | Walker ........................ | 411/387.1 |
| 8,430,617 B2 * | 4/2013 | Hettich et al. ................ | 411/383 |
| 8,522,412 B1 * | 9/2013 | Walker ............................ | 29/255 |
| 2002/0006320 A1 * | 1/2002 | Kupper et al. ................ | 411/383 |
| 2004/0186478 A1 * | 9/2004 | Jackson ......................... | 606/73 |
| 2007/0231106 A1 * | 10/2007 | Walker ......................... | 411/401 |
| 2009/0028664 A1 * | 1/2009 | Peng et al. .................... | 411/383 |
| 2010/0025596 A1 * | 2/2010 | Zeytoonian ................ | 250/492.2 |

OTHER PUBLICATIONS

Fence Post Removal—How to Remove a Broken Fence Post, http://www.timberclick.com/index.php/london/fence-post-removal/, 2009, TimberClick, Old Woodyard, Watling Street, Bean, Nr Dartford, Kent DA2 8AH.

* cited by examiner

*Primary Examiner* — Roberta Delisle
(74) *Attorney, Agent, or Firm* — Richard L. Marsh

(57) ABSTRACT

A pole butt removal tool is an unconventionally threaded shaft and a hub. The unconventionally threaded shaft has a minor diameter, a major diameter, a hub end and a terminal end with the terminal end ending in a conical point. The major diameter as a ratio to the minor diameter of the thread is greater than a major diameter/minor diameter ratio of Unified Coarse Thread Series (UNC) and the pitch is significantly less than Unified Coarse Thread Series (UNC).

20 Claims, 3 Drawing Sheets

SHEARED POLE BUTT REMOVAL TOOL

RELATED APPLICATION DATA

This application is a non-provisional application of Applicants' provisional application Ser. No. 61/590,389 filed on 25 Jan. 2012, Applicants claiming the priority date established therein and incorporating the entirety of the disclosure thereof into this application with this reference thereto.

BACKGROUND OF THE INVENTION

1. Field of the Invention

This invention relates to a tool for removing broken pole butts from the hole where the pole had been placed in the earth.

2. Prior Art Statement

Poles supporting telephone cables, electrical cables, traffic signs, advertising signs and the like often are sheared off basically at the ground level when impacted by moving vehicles. Such poles also are subject to decay or other forms of destruction and the owner of the pole is faced with the challenge of removing the remainder of the pole, i.e. the pole butt from the earth. For instance, when the pole is broken off at ground level, and it is impossible to remove the pole butt without calling for a backhoe to dig around the pole butt sufficiently to wrap a choke chain around the pole butt to lift the pole butt from the mounting hole. The backhoe and its operator present an extra expense to the company owning the pole in addition to the delay in removal of the pole butt caused by employment of the backhoe and thus excavation is disruptive and labor intensive. Therefore, there exists a great need for a pole butt removal tool that may be quickly installed in the pole butt and used to extract the pole without excavating the earth around the pole thus resulting in great labor and cost savings.

Abandoning the pole butt in the earth leaves an environmentally unfriendly product in the earth. As infrastructure is continuously installed, the possibility of abandoning a usable site is not an option. Repositioning the pole may not be possible as adjacent infrastructure might be present or engineering factors such as the length of line available particularly in utility installations may prevent relocation. Thus, it is important and environmentally friendly to reuse the location of the previous pole for installing the replacement pole. Accordingly, a pole butt removal tool that preserves a pole location is needed thus preventing disruption of adjacent infrastructure and providing cost savings in relocating lines and the like.

Extraction of the pole butt by driving a grounding rod into the butt, attaching a large grip to the grounding rod and attempting to extract the pole free of the ground with a winch usually results in the rod disengaging from the pole butt and projecting toward the operator is extremely hazardous to the workers. Though driving a ground rod into the stump for extraction of the pole butt sometimes succeeds, the large diameter copper ground rod becomes part of the waste stump and is lost resulting in an increased cost to the utility. It is obvious that a tremendous need exists for a pole butt removal tool that safely, effectively and in an environmentally friendly manner removes a pole butt from the earth while effectively leaving a usable hole in the earth for insertion of a new or replacement pole.

It is known to remove a small fence post by threading a conventionally threaded lag screw or threaded eyelet into a hole drilled into a broken or rotted fence post butt and using a hydraulic jack or engine lifting device to extract the post butt. For instance, see the explanation from Timber Click, Old Woodyard, Watling Street, Bean, Nr Dartford, Kent DA2 8AH which may be found at the corporation website http://www.timberclick.com/index.php/london/fence-post-removal/. Though a hole is drilled in the post butt and the conventionally threaded lag screw or threaded eyelet is inserted, many turns of the threaded eyelet or lag screw is required as the largest of lag screws has a thread pitch of at least 4 threads per inch. Thus, even the shortest of lag screws or threaded eyelets require at least three inches of penetration into the wood for effective removal of the post butt requiring at least twelve turns. Therefore, the great need for a pole butt removal tool having a non-conventional thread pitch still exists in order to provide for rapid insertion of the removal tool and rapid removal of the tool from the pole butt after extraction of the pole butt from the earth.

It is also known to provide an extraction tool for removal of pole butts. For instance, see the U.S. Pat. No. 7,686,359 B1 issued on 30 Mar. 2010 to William Arlis Walker. The device is provided with a drill bit inserted into the end of a partially threaded rod wherein a hole is drilled in a pole butt with the drill bit, the threaded portion of the device following the drill bit into the hole. As the drill bit is only 5 inches long and is not removed from the pole butt after drilling begins, the threaded portion of the rod compacts additionally drilled wood below the threaded portion thus increasing the difficulty of threading the threaded portion into the pole butt and potential loss of thread engaging integrity. Additionally, the thread pitch of the threaded portion is four threads per inch thus requiring 48 turns to thread the twelve inch threaded portion into the pole butt. Accordingly, there is a great need for a pole butt removal tool that is rapidly attached to a Kelly bar, inserted into a previously drilled 24 inch deep hole in a pole butt, turned only a few times to full engagement with the pole butt and thereafter used to extract the pole butt from the earth.

SUMMARY OF THE INVENTION

One object of this invention is to provide a tool to aid utility companies in easily removing pole butts safely, effectively and in an environmentally friendly manner.

Another object of this invention is to provide a tool for removal of post butts that results in the savings of the ground rod.

A primary goal of this invention is to provide a tool for removal of pole butts that is economically friendly, easy to use and results in labor savings.

A significant feature of this invention is to provide a tool for removal of pole butts that results in reuse of the existing hole for a replacement pole.

A main purpose of this invention is to provide an extremely high lead angle pole butt removal tool for rapid insertion, quick extraction of the pole butt and rapid removal of the tool from the pole butt.

A primary principle of this invention is to provide a non-standard thread for a pole butt removal tool for rapid insertion, quick extraction of the pole butt and rapid removal of the tool from the pole butt.

A principal aim of this invention is to provide a greater than conventional thread pitch for a pole butt removal tool for rapid insertion, quick extraction of the pole butt and rapid removal of the tool from the pole butt.

A primary aspect of this invention is to provide a higher major diameter/minor diameter ratio for a screw thread especially for a pole butt removal tool for rapid insertion, quick extraction of the pole butt and rapid removal of the tool from the pole butt.

Another goal of this invention is to provide a pole butt removal tool that slightly expands the pole butt at the surface of the earth such that the pole butt is easily extracted and an earth hole is left intact for insertion of a new or replacement pole.

Other objects and features of this invention will become readily apparent from a careful reading and consideration of the detailed description and claims herefollowing.

DESCRIPTION OF THE PREFERRED EMBODIMENTS

Figure 1:
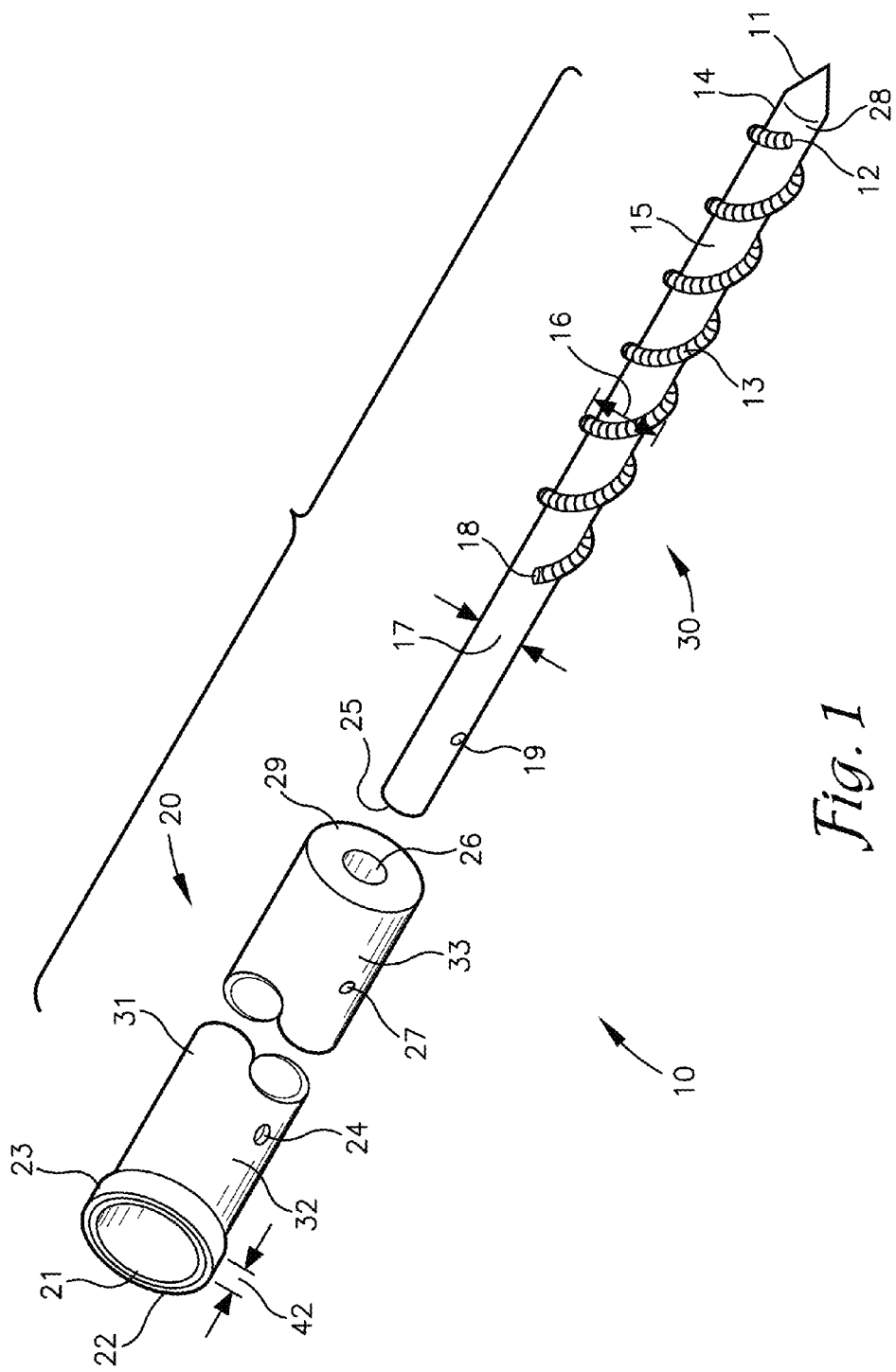
FIG. 1 is an exploded perspective view of the preferred embodiment of the pole butt removal tool of this invention with an hub unit broken in half to show a hole in the base thereof for insertion of a shaft of the pole butt removal tool.

Referring now to FIG. 1, pole butt removal tool is generally shown by number 10, pole butt removal tool 10 comprising an unconventional threaded shaft 30 and a hub 20. Threaded shaft 30 comprises a metal shaft 15 provided with a thread 13, a conical point 11 on a terminal end 14 and a hub end 25 opposite terminal end 14. Hub 20 is provided with holes 21, 26 bored into opposite ends 22, 29 thereof for coupling threaded shaft 30 to a Kelly bar 101 of a utility pole digging truck 100 as will be fully explained hereinafter. Though thread 13 is shown in FIG. 1 as right handed, left handed threading is within the scope of this invention as the utility pole digging truck 100 has means to turn in either direction. As well known in the art, Kelly bars may be round, square or hexagonal in cross section and thus hub 20 is provided with a round Kelly bar hole 21 at collar end 22 thereof such that a Kelly bar of any cross section may be coupled therein. Though hub 20 is preferably separable from threaded shaft 30, it is fully within the scope of this invention to permanently join hub 20 and shaft 15.

Kelly bar hole 21 in collar end 22 of hub 20 is approximately 3½ inches in diameter to receive Kelly bar 101 therein while shaft end 29 of hub 20 has a 1½ inch diameter shaft receiving hole 26 disposed thereinto. Collar end 22 of hub 20 is provided with a one-quarter inch thick, one inch wide collar 23 to provide added strength to collar end 22. Collar 23 is four and one-half inches in diameter and is thus disposed upon a four inch outside diameter main body 31 of hub 20. In FIG. 1, main body 31 is separated with shaft end portion 33 rotated 180 degrees with respect to Kelly bar end portion 32 in order to show shaft receiving hole 26 disposed into shaft end 29. It should be fully understood here that hub 20 is one piece and that at the break line, shaft end portion 33 is joined to Kelly bar end portion 32 upon rotation to properly align shaft end portion 33 with Kelly bar end portion 32. Kelly bar end portion 32 may be constructed of one-quarter inch wall thick, four inch diameter steel pipe with collar 23 welded to collar end 22 while shaft end portion 33 may be from four inch diameter solid steel bar stock with coupling hole 26 axially bored therethrough, Kelly bar end portion 32 concentrically welded to shaft end portion 33. Kelly bar end portion 32 has an 11/16 inch diameter Kelly bar pin hole 24 bored diametrically therethrough spaced away from collar 23. Kelly bar pin hole 24 is adapted to receive a hardened steel drive pin thereinto for coupling Kelly bar 101 to hub 20. Shaft end portion 33 likewise has a shaft pin hole 27 bored diametrically therethrough spaced inwardly of shaft end 29. Shaft pin hole 27 is adapted to receive a drive pin thereinto when hub end 25 of threaded shaft 30 is inserted into coupling hole 26 and shaft coupling hole 19 in shaft 15 is aligned with shaft pin hole 27.

Still referring to FIG. 1, metal shaft 15 is at least 24 inches, preferably from 30 to 40 inches in length and most preferably about 36 inches in length from a hub end 25 to conical end 11, however longer shafts may be constructed in order to provide for greater penetration of pole butt removal tool 10 into pole butt 80. Shaft 15 is most preferably a 17/16" diameter cold rolled solid steel shaft wherein conical point 11 at terminal end 14 of shaft 15 is preferably tapered at a 45 degree angle. Other angles for conical point 11 are possible, however it has been found that a 45 degree angle for conical point 11 allows for rapid insertion and thus rapid centering of shaft 15 into pilot hole 84 drilled into pole butt 80. Proximate conical end 11 is a distal end 12 of thread 13 wherein thread 13 is preferably disposed upon shaft 15 from distal end 12 toward hub end 25 for a length of about 24 inches. Thread 13 may begin immediately at conical point 11, however it has also been found that a pilot alignment section 28 of shaft 15 between conical point 11 and distal end 12 of thread 13 is beneficial in properly aligning pole butt removal tool 10 with pilot hole 84 in pole butt 80. As thread 13 is preferably disposed upon shaft 15 rather than cut into a larger diameter shaft, threaded shaft 30 thus has a minor diameter of 17/16". Spaced inwardly from hub end 25 is a coupling pin hole 19 disposed through shaft 15, coupling pin hole 19 preferably about one-half inch in diameter.

Major diameter 16 defining thread 13 upon shaft 15 has a ratio to minor diameter 17 greater than a major diameter/minor diameter ratio of Unified Coarse Thread Series (UNC) and more particularly, the ratio between major diameter 16 and minor diameter 17 is at least 1.4 and thus for a diameter of shaft 15 of one and seven sixteenths inches (17/16"), major diameter 16 of thread is at least two inches (2") but most preferably, major diameter 16 is two and seven sixteenths inches (27/16"). Thread 13 is from about 16 to about 28 inches in length and most preferably 24 inches along shaft 15. Thread 13 disposed upon minor diameter 17 also has a pitch significantly less than a pitch defined by Unified Coarse Thread Series (UNC). As UNC threads for all sizes of bolts and screws is not less than two threads per inch (TPI), thread 13 of pole butt removal shaft 10 is between about 0.15 to 0.35 threads per inch, preferably from 0.25 to 0.30 threads per inch. The inventors hereof have found that a thread pitch of 0.286 TPI is achieved by wrapping a one-half inch diameter steel reinforcing rod around a steel shaft of 17/16 inch diameter for a length of 24 inches along shaft 15 and welding the steel reinforcing rod to the steel shaft. Though a round cross section for thread 13 is preferred, thread 13 may have any cross section selected from the group consisting of round, triangular, oval, polygonal and combinations thereof.

Figure 3:
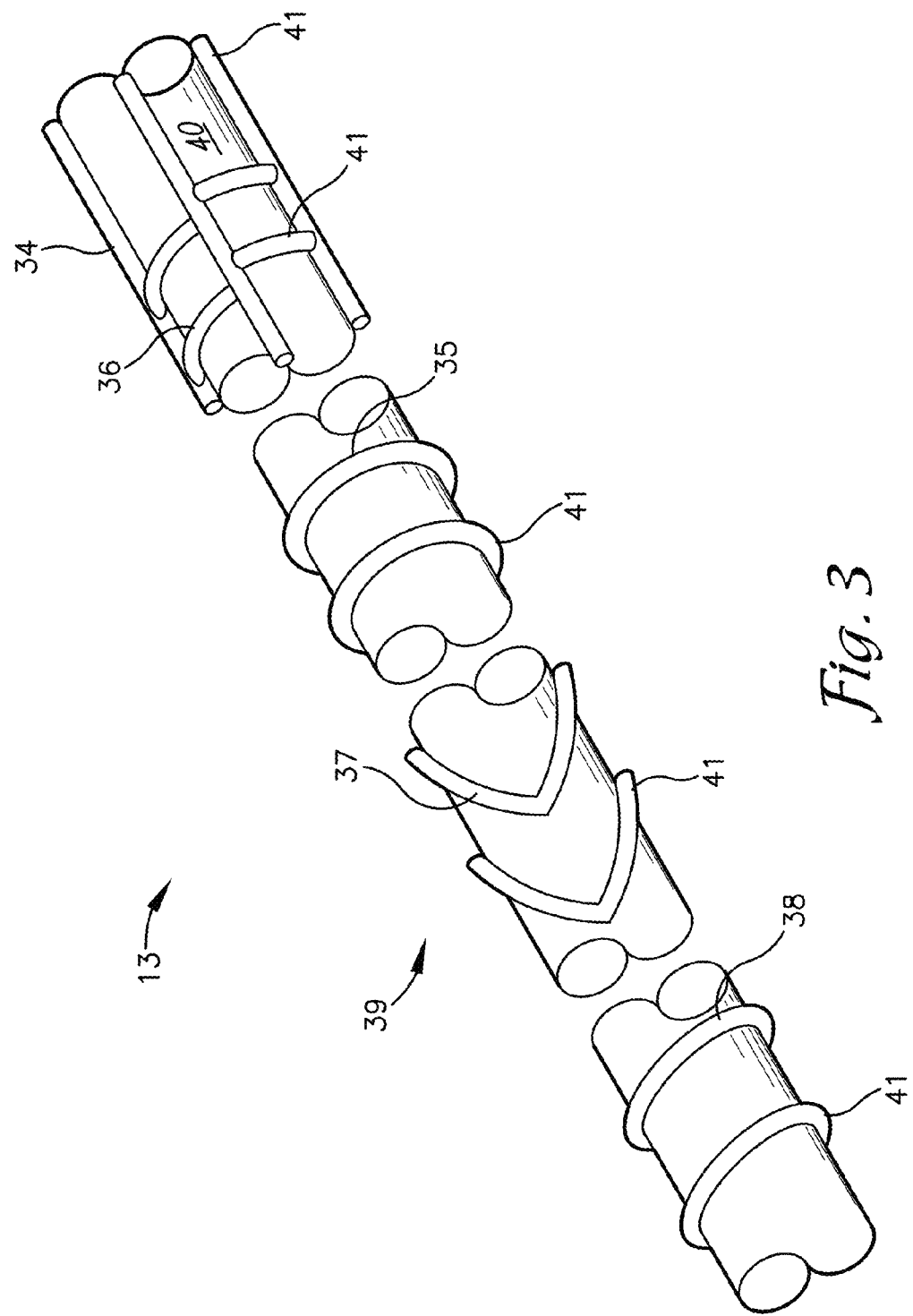
FIG. 3 is an enlarged view of a detail of various thread of the unconventional threaded shaft of this invention.

Referring now to FIG. 3, the preferred steel reinforcing rod for thread 13 is provided with raised protrusions 41 disposed upon an outer surface 40 thereof, raised protrusions 41 typically extending both longitudinally and circumferentially around outer surface 40 thus describing a cross hatch pattern 36. Though a steel reinforcing rod with cross hatch pattern 36 has been used to advantage for thread 13, thread 13 may have raised protrusions disposed upon thread 13 in a pattern 39 selected from the group consisting of longitudinal 34, circumferential 35, cross hatch 36, chevrons 37, threads 38 and combinations thereof. Chevrons 37 may be disposed with the apex pointed in either direction along thread 13 and thread protrusions 38 may have the same hand as thread 13 or may be of opposite hand as thread 13. Thread 13 may be terminated at distal end 12 with a square cut perpendicular to a longitudinal axis thereof, be rounded smooth, or tapered from major diameter 16 to minor diameter 17 of threaded shaft 30 and most preferably is tapered from major diameter 16 to minor diameter 17. In like manner, thread 13 may be terminated at proximal end 18 with a square cut perpendicular to a longitudinal axis thereof, be rounded smooth, or tapered from major diameter 16 to minor diameter 17 and most preferably is square cut as shown in FIG. 1.

Figure 2:
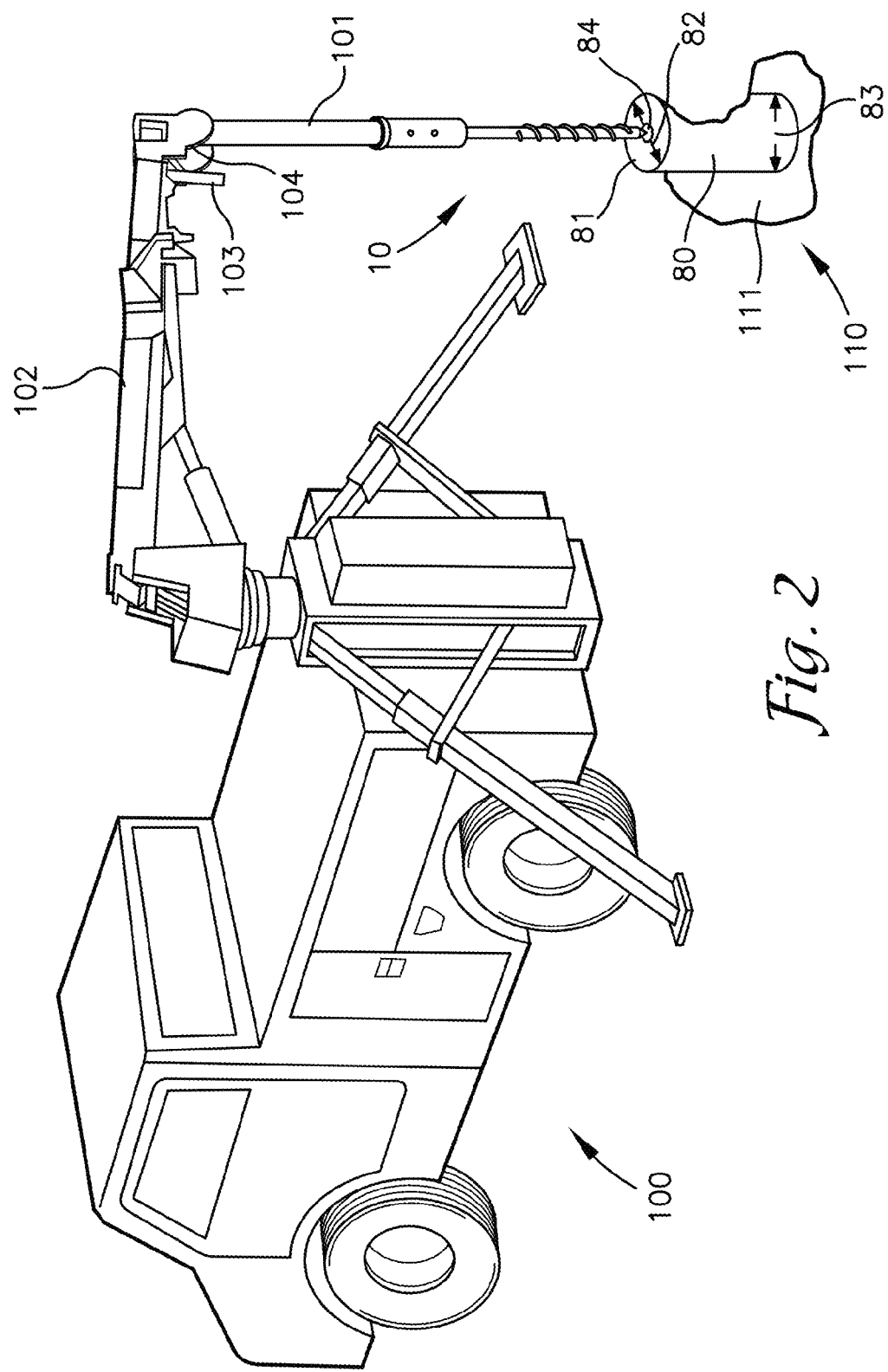
FIG. 2 is a perspective view of the pole butt removal tool of this invention coupled to a Kelly bar of a power unit on a boom of a utility pole digging truck.

Referring specifically to FIG. 2 wherein a portion 111 of the earth's surface around pole butt 80 has been broken away to show a base thereof, in an operation of removing pole butt 80 from an earth hole 110, a one and one half inch diameter pilot hole 84 is drilled in the center of the pole butt 80 to a depth of at least 24 inches. Pole butt removal tool 10 is then attached to Kelly bar 101 of digger truck 100 wherein Kelly bar 101 has been previously attached to a digging power unit 104 on a boom 102 of digger truck 100. Conical point 11 of shaft 15 of pole butt removal tool 10 is inserted into pilot hole 84 in a surface 81 of pole butt 80, conical point 11 and terminal end 14 of shaft 15 sliding easily into pilot hole 84 with distal end 12 of thread 13 resting upon surface 81 of pole butt 80 at the top of pilot hole 84. Kelly bar 101 is rotated in a thread engaging direction thus engaging distal end 12 of thread 13 into pilot hole 84 in pole butt 80, Kelly bar 101 rotated sufficiently to engage the entire length of thread 13 from distal end 12 to proximal end 18 into pilot hole 84 in pole butt 80. As thread 13 has a non-conventional thread pitch previously described above, thread 13 is fully engaged within pole butt 80 within a few turns, typically from about four to about eight turns though thread 13 may be of greater or lesser pitch without departing from the scope of this invention. Care is taken to refrain from inserting thread 13 to a depth beyond proximal end 18 into pilot hole 84 in pole butt 80 and thus beyond surface 81 of pole butt 80 to ensure that pole butt removal tool 10 may be easily extracted from pole butt 80 upon removal of pole butt 80 from earth hole 110. As is readily apparent from the above detailed description of pole butt removal tool 10, major diameter 16 of thread 13 is sufficiently larger than pilot hole 84 such that threading of thread 13 causes pole butt 80 to enlarge slightly from a diameter 82 at surface 81 to the full length of thread 13 thus expanding earth hole 110 to a diameter approximately equal to a base diameter 83 of pole butt 80 such that when pole butt 80 is extracted from earth hole 110, the integrity of earth hole 110 is preserved for insertion of a new or replacement pole therein without re-digging earth hole 110. Pole butt 80 may be fully removed from earth hole 110 with boom 102 of digger truck 100, however, it is conventional practice to extract pole butt 80 to about a foot above the surface of the earth such that a choker chain may be wrapped around pole butt 80 wherein further extraction of pole butt 80 proceeds with a winch 103 on boom 102. Conventional practice thus allows removal of pole butt removal tool 10 from pole butt 80 while frictional engagement with earth hole 110 is maintained.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. A pole butt extraction tool comprises an unconventionally threaded shaft and a hub, said unconventionally threaded shaft having a minor diameter, a major diameter, a hub end and a terminal end, said terminal end provided with a conical point, said shaft having a length from said conical point to said hub end of at least 24 inches, said conical point adapted to center said shaft into a hole previously drilled into a pole butt, said minor diameter approximately equal to said hole drilled into said pole butt buried in an earth hole, said major diameter defining a thread upon said minor diameter of said shaft, said major diameter as a ratio to said minor diameter greater than a major diameter/minor diameter ratio of Unified Coarse Thread Series (UNC), said hub comprising means for attachment to said hub end of said unconventionally threaded shaft and means for attachment to a Kelly bar of a pole hole digging unit wherein said unconventionally threaded shaft of said pole butt removal tool is threadedly driven into said hole drilled into said pole butt by said pole hole digging unit, said thread rapidly cutting threads into said pole butt for rapid removal of said pole butt from said earth hole.

2. The pole butt extraction tool as in claim 1 wherein said means for attachment to said hub end comprises a hole disposed into a shaft end of said hub wherein said hub end of said threaded shaft is adapted to be removably affixed thereto and wherein a hole disposed into a collar end of said hub is adapted to be removably affixed to said Kelly bar.

3. The pole butt extraction tool as in claim 2 wherein said Kelly bar carrying said unconventionally threaded shaft threaded into said pole butt quickly extracts said pole butt from said earth hole by upward operation of a boom of said pole hole digging unit and wherein said threaded shaft is rapidly removed from said extracted pole butt by reverse rotation of said unconventionally threaded shaft.

4. The pole butt extraction tool as in claim 3 wherein said unconventionally threaded shaft is from 30 to 40 inches in length from said conical point to said hub end and said thread disposed thereupon is from about 16 to about 28 inches in length.

5. The pole butt extraction tool as in claim 4 wherein said unconventionally threaded shaft is 36 inches in length from said conical point to said hub end and said thread disposed thereupon is 24 inches in length between a distal end and a proximal end thereof.

6. The pole butt extraction tool as in claim 5 wherein said distal end of said thread is disposed adjacent said conical point.

7. The pole butt extraction tool as in claim 6 wherein said major diameter to minor diameter ratio at least 1.4.

8. A pole butt extraction tool comprises an unconventionally threaded shaft and a hub, said unconventionally threaded shaft having a minor diameter, a major diameter, a hub end and a terminal end, said terminal end provided with a conical point, said shaft having a length from said conical point to said hub end of at least 24 inches, said conical point adapted to center said shaft into a hole previously drilled into a pole butt, said minor diameter approximately equal to said hole drilled into said pole butt buried in an earth hole, said major diameter defining a thread upon said minor diameter of said shaft, said thread upon said minor diameter having a pitch significantly less than a pitch defined by Unified Coarse Thread Series (UNC), said hub comprising means for attachment to said hub end of said unconventionally threaded shaft and means for attachment to a Kelly bar of a pole hole digging unit wherein said unconventionally threaded shaft of said pole butt removal tool is threadedly driven into said hole drilled into said pole butt by said pole hole digging unit, said thread rapidly cutting threads into said pole butt for rapid removal of said pole butt from said earth hole.

9. The A pole butt extraction tool as in claim 8 wherein said pitch is from 0.15 to 0.35 threads per inch.

10. The A pole butt extraction tool as in claim 9 wherein said pitch is from 0.25 to 0.30 threads per inch.

11. The A pole butt extraction tool as in claim 10 wherein said minor diameter is between one and one quarter inches and two and one half inches.

12. The A pole butt extraction tool as in claim 11 wherein a difference between said major diameter and said minor diameter is between one quarter inch and three quarters inch.

13. The A pole butt extraction tool as in claim 12 wherein said thread has a cross section selected from the group consisting of round, triangular, oval, polygonal and combinations thereof.

14. The pole butt extraction tool as in claim 13 wherein said thread is provided with raised protrusions disposed upon an outer surface thereof.

15. The pole butt extraction tool as in claim 14 wherein said raised protrusions are disposed upon said thread in a pattern selected from the group consisting of longitudinal, circumferential, cross hatch, chevrons, threads and combinations thereof.

16. The pole butt extraction tool as in claim 15 wherein threaded raised protrusions are of the same hand as said thread.

17. The pole butt extraction tool as in claim 15 wherein said threaded raised protrusions are of an opposite hand as said thread.

18. A threaded shaft for a pole butt removal tool comprises an unconventionally threaded shaft having a minor diameter, a major diameter, a hub end and a terminal end, said terminal end comprising a conical point, said shaft having a length from said conical point to said hub end of at least 24 inches, said conical point adapted to center said shaft into said hole previously drilled into a pole butt buried in an earth hole, said pole butt sheared off adjacent a surface of said earth hole, said minor diameter approximately equal to said hole drilled into said pole butt, said major diameter defining a thread upon said minor diameter of said shaft, said major diameter as a ratio to said minor diameter greater than a major diameter/minor diameter ratio of Unified Coarse Thread Series (UNC), said thread upon said minor diameter having a pitch significantly less than a pitch defined by said Unified Coarse Thread Series (UNC), said hub end comprising means for attachment to a Kelly bar of a pole hole digging unit wherein said unconventionally threaded shaft of said pole butt removal tool is driven into said hole drilled into said pole butt by said pole hole digging unit, said thread rapidly cutting threads into said pole butt for rapid removal of said pole butt from said earth hole.

19. The threaded shaft for a pole butt extraction tool as in claim 18 wherein said thread is a right hand thread.

20. The threaded shaft for a pole butt extraction tool as in claim 18 wherein said thread is a left hand thread.

\* \* \* \* \*